US012580660B2

(12) United States Patent
　Fournier

(10) Patent No.: US 12,580,660 B2
(45) Date of Patent: Mar. 17, 2026

(54) METHOD AND SYSTEM FOR MULTICHANNEL POINT-TO-POINT RADIO TRANSMISSION WITH LIMITATION OF COUPLING LOSSES

(71) Applicant: SPECTRONITE, Biot (FR)

(72) Inventor: Jean-Philippe Fournier, Mougins (FR)

(73) Assignee: SPECTRONITE, Biot (FR)

( * ) Notice: Subject to any disclaimer, the term of this patent is extended or adjusted under 35 U.S.C. 154(b) by 314 days.

(21) Appl. No.: 18/566,604

(22) PCT Filed: Jun. 2, 2022

(86) PCT No.: PCT/FR2022/051046
§ 371 (c)(1),
(2) Date: Dec. 1, 2023

(87) PCT Pub. No.: WO2022/254152
PCT Pub. Date: Dec. 8, 2022

(65) Prior Publication Data
US 2024/0267128 A1　　Aug. 8, 2024

(30) Foreign Application Priority Data

Jun. 3, 2021　(FR) ................................. FR2105844

(51) Int. Cl.
*H04B 10/516* (2013.01)
*H04L 27/36* (2006.01)
(52) U.S. Cl.
CPC ....... *H04B 10/5161* (2013.01); *H04L 27/364* (2013.01); *H04B 2210/006* (2013.01)

(58) Field of Classification Search
CPC .......... H04B 10/5161; H04B 2210/006; H04L 27/364
(Continued)

(56) References Cited

U.S. PATENT DOCUMENTS 7,072,411 B1　7/2006　Dollard
7,796,574 B2 *　9/2010　Dabak ................. H04L 27/2649
370/335

(Continued)

OTHER PUBLICATIONS

International Preliminary Report on Patentability along with English translation of the Written Opinion of the International Searching Authority, issued Dec. 14, 2023, in connection with International Patent Application No. PCT/FR2022/051046, 7 pages.
(Continued)

*Primary Examiner* — Dalzid E Singh

(57) ABSTRACT

The invention relates to a data transmission method, comprising the steps of: generating from a data stream to be transmitted, a plurality of frequency-domain digital sample streams, each digital sample stream modulating a respective subcarrier defining a respective subcarrier channel, converting the frequency-domain sample streams into temporal sample streams, by an inverse spectral transform, combining the temporal sample streams into a composite stream, frequency-shifting the composite stream using a digital oscillator at an intermediate frequency above 1 GHz, converting the shifted composite stream into an analog signal, frequency-shifting the analog signal to a carrier frequency above 2 GHz using an analog oscillator at a carrier frequency, filtering the analog signal to attenuate the carrier frequency, and transmitting the filtered signal via an antenna.

11 Claims, 5 Drawing Sheets

(58) Field of Classification Search
USPC ........................................................ 398/115
See application file for complete search history.

(56) References Cited

U.S. PATENT DOCUMENTS

| | | | | |
|---|---|---|---|---|
| 8,625,508 B2 * | 1/2014 | Jeong | .................. | H04L 27/2647 |
| | | | | 370/329 |
| 9,124,369 B2 * | 9/2015 | Ji | ......................... | H04J 14/0298 |
| 10,270,637 B2 * | 4/2019 | McCallister | ........ | H04L 27/2623 |
| 2008/0109696 A1 * | 5/2008 | Lakkis | .................. | H04L 1/0057 |
| | | | | 714/752 |
| 2009/0161529 A1 * | 6/2009 | Speth | ................ | H04L 27/26524 |
| | | | | 375/148 |
| 2012/0087668 A1 | 4/2012 | Li et al. | | |
| 2015/0139348 A1 | 5/2015 | Tong et al. | | |
| 2017/0034317 A1 | 2/2017 | Kenney et al. | | |
| 2017/0201288 A1 | 7/2017 | Magers | | |

OTHER PUBLICATIONS

International Search Report and Written Opinion of the International Searching Authority dated Sep. 14, 2022, in connection with International Application No. PCT/FR2022/051046, 15 pages.
Mak, et al., "Transceiver Architecture Selection: Review, State-of-the-Art Survey and Case Study," IEEE Circuits and Systems Magazine, vol. 7, No. 2, Apr. 2007, 20 pages.
Nortel Networks, "Analysis of Node B Impacts," R1-040295, 3GPP TSG RAN WG1 Meeting #36, Malaga, Spain, Feb. 16-20, 2004, 8 pages.

* cited by examiner

METHOD AND SYSTEM FOR MULTICHANNEL POINT-TO-POINT RADIO TRANSMISSION WITH LIMITATION OF COUPLING LOSSES

CROSS-REFERENCE TO RELATED APPLICATIONS

This application is a 371 of International Application No. PCT/FR2022/051046, filed Jun. 2, 2022, which claims priority to French Patent Application No. FR2105844, filed Jun. 3, 2021, the disclosures of which are herein incorporated by reference in their entirety.

BACKGROUND

The present invention relates to point-to-point radio wave transmissions used in particular in transmission networks forming the infrastructure of mobile networks, or in certain private radio networks. Typically, these transmissions are carried out in frequency bands between 6 and 42 GHz.

SUMMARY

With the advent of new uses related to the democratization of Internet access via mobile networks, mobile network operators have a growing need to increase the capacity of their networks. Thus, the speeds offered by point-to-point links have been significantly increased thanks to the use of new techniques, including new and increasingly complex modulation techniques such as MAQ2048 or MAQ4096. However, the rates of point-to-point links remain limited by the width of the frequency bands assigned to these links.

In addition, increasing the width of transmission channels is a very complex process because these channels are defined by international regulations and therefore cannot evolve quickly. In addition, such point-to-point radio transmission links have been in operation for several decades. The radio spectrum has therefore already been allocated as channels of defined width, and the radio spectrum still available is therefore made up of narrow and mostly non-adjacent channels.

FIG. 1 represents a traditional single-channel transmission system. This system includes an inner unit IDU and an outer unit ODU coupled to an antenna AT1. The outer unit ODU is placed as close as possible to the antenna AT1, while the inner unit IDU may be placed at a distance, for example in a room where it is readily accessible for maintenance operations. The inner unit IDU includes a modem M1 managing the transmission and reception of a radio signal. The digital output signal, on the emission side, of the modem M1 is converted by a digital/analog converter D1 into an analog signal that is filtered by a bandpass filter BF1, wherein the filtered analog signal is provided to a first frequency mixer 1 shifting the analog signal to an intermediate frequency IFx generated by a local oscillator O1. The modulated carrier IFx is transmitted to the outer unit ODU where it is converted to an end carrier frequency RFx+IFx by a second frequency mixer 2 also receiving an intermediate carrier at the frequency RFx from a local oscillator O2. The output signal of the frequency mixer 2 is amplified by an amplifier A1, then filtered by a bandpass filter BF2. The filter BF2 is connected to the antenna AT1 via a three-way duplexer 3, such as a mechanical circulator, that also connects the antenna to a receive chain ORC-IRC.

The Modem M1, converter D1 and frequency mixer 1 for the intermediate frequency IFx are nowadays commonly integrated in a dedicated modem circuit. The frequency mixer 2 that converts to the end carrier is also commonly integrated in a dedicated integrated power circuit, wherein the signal is transmitted from the modem circuit to the power circuit at the frequency IFx.

The spectrum of the output signal from mixer 2 is shown in FIG. 2. This signal includes three components, namely two components centered respectively on the frequencies RFx-IFx and RFx+IFx and modulated by the analog signal from modem M1, and a component at frequency RFx. The bandpass filter BF2 cancels one of the two images of the modulated signal centered on the frequencies RFx-IFx and RFx+IFx, as well as the carrier at the frequency RFx. Yet, the end frequency RFx+IFx is generally higher than 6 GHz and the Frequency IFx is lower than 400 MHz, whereby the signal can be transmitted between the inner unit IDU and the outer unit ODU without excessive losses. The filter BF2 is therefore highly selective. At these frequencies, only mechanical or cavity filters can achieve the required level of rejection. However, cavity filters are particularly complex and expensive to manufacture.

It has also been proposed to couple several channels to increase the transmission rate. To this end, as illustrated in FIG. 3, several single-channel transmit chains TX1, TX2 are coupled to the antenna AT1. For this purpose, three-way mechanical circulators C1, C2 are used instead of the duplexer 3, and connected in series before the antenna AT1. In order for a transmission chain TX2 separated from the antenna by several circulators C1, C2 to reach the antenna, the link between each transmission chain and its circulator is equipped with a filter F1, F2 having a high reflection coefficient, to reflect the signal transmitted by the chain TX2 towards the channel of the circulator C1 connected to the antenna. In this way, the signal emitted by the chain TX2 is transmitted by the circulators C2 and C1 to the filter F1, which reflects the received signal back to the antenna AT1.

Symmetrically, several single-channel reception systems can be coupled to a single antenna, each via a circulator and a selective filter adapted to the corresponding reception channel.

As a result, the filters F1, F2 are designed both to pass only the signal emitted by their respective transmission chain TX1, TX2, and have a high reflection coefficient for the signals emitted by the other transmission chains connected to the antenna. It turns out that the required filters F1, F2 are even more selective than the filter BF2 located at the output of the transmission chain shown in FIG. 1 and are therefore even more complex and costly.

In addition, high reflection coefficients are difficult to achieve. As a result, the signals to be transmitted undergo considerable attenuation as they pass through the circulators. For example, passing through two circulators upon transmission and reception can result in a power loss of up to 6 dB, representing three-quarters of the radio power dissipated as heat in the filters and circulators. In addition, cavity filters are structurally matched to the frequencies to be filtered, so that a change in the transmission channel requires a replacement of the corresponding filters.

The radio power losses therefore result in a significant increase in the power consumption required to achieve a given transmission power.

Cavity filter manufacturing technologies also cause a frequency limit. There are virtually no solutions for producing cavity filters operating at frequencies above 13 GHz, bearing in mind that the desired frequency bands for this purpose reach 42 GHz.

A dual-carrier or dual-channel system has also been proposed, comprising a modem generating two carriers which are modulated separately and transmitted to the outer unit at a first intermediate frequency. The outer unit performs analog/digital conversion and digital filtering to isolate the two carriers. The outer unit then performs a frequency shift of these two carriers to place them at frequencies combining the initial position of each carrier relative to the first intermediate frequency and the second intermediate frequency used to shift the two carriers to the end frequency.

This system performs several conversions, analog to digital and back, which generates a large number of spurious images that then have to be filtered. The positions of the carriers at the modem's output around the first and second intermediate frequencies impose severe constraints on the characteristics of the filter, which processes images from both channels and eliminates spurious images. Moreover, the complexity of this system increases exponentially as the number of channels increases. In practice, this number can hardly exceed two.

An OFDM (Orthogonal Frequency-Division Multiplexing) subcarrier modulation technique has also been proposed, enabling multichannel transmission by subcarrier grouping. However, the spectral efficiency of such a technique rapidly decreases as the channel width decreases.

It is therefore desirable to increase the throughput of multichannel point-to-point radio links by using available frequency bands. It is also desirable to avoid using selective and therefore expensive mechanical filters. It may also be desirable to implement a multichannel transmission system in which the number and width of the channels can be varied.

Embodiments relate to a data transmission method comprising the steps of: generating from a data stream to be transmitted, a plurality of frequency-domain digital sample streams, each digital sample stream containing a portion of the data stream to be transmitted and modulating a respective subcarrier defining a respective subcarrier channel, the ensemble of subcarrier channels covering a frequency band, converting the digital frequency-domain sample streams into digital temporal sample streams, using an inverse spectral transform, combining the temporal digital sample streams into a composite temporal digital sample stream, frequency shifting the composite temporal digital sample stream using a digital oscillator to an intermediate frequency above 1 GHz, converting the shifted composite sample stream into an analog signal), frequency-shifting the analog signal to a transmission frequency above 2 GHz, using an analog oscillator at a carrier frequency, filtering the analog signal to attenuate the carrier frequency, and transmitting the shifted analog signal via an antenna.

According to an embodiment, the method comprises a step of filtering each stream of temporal digital samples by a respective digital filter before producing the composite temporal digital sample stream.

According to an embodiment, the composite temporal digital sample stream is transmitted via an optical link before being shifted to the intermediate frequency.

According to an embodiment, the subcarrier channels are grouped into transmission channels dividing a frequency band, one of the transmission channels grouping subcarrier channels not used for transmitting data streams.

According to an embodiment, the method comprises the steps of: generating a plurality of further composite streams of temporal digital samples in parallel, and shifting each of the further composite streams of temporal digital samples to a respective intermediate frequency by means of a respective digital oscillator, each of the shifted composite streams of temporal digital samples being transmitted in analog form in a respective frequency band.

According to an embodiment, the data stream to be transmitted undergoes scrambling so that bits of the stream have a random distribution, coding to introduce redundancy or error correction data into the stream, interleaving to form a stream of data blocks, and modulation to transform the stream of data blocks into a stream of frequency-domain samples in the form of complex numbers.

According to an embodiment, the scrambling and coding are performed by a plurality of scrambling modules and a plurality of coding modules in parallel to increase a transmission rate of the data stream transmitted for interleaving.

Embodiments also relate to a method of receiving data, comprising the steps of: receiving an analog signal) via an antenna, shifting the received analog signal to an intermediate frequency above 1 GHz and below an analog signal transmission frequency above 2 GHz, using an analog oscillator at a carrier frequency, filtering the analog signal to attenuate the carrier frequency, converting the analog signal into a composite stream of digital samples at the intermediate frequency, shifting the composite stream of temporal digital samples to a baseband using a digital oscillator at the intermediate frequency, generating, from the baseband composite digital sample stream, by means of a spectral transform, a plurality of frequency-domain digital sample streams, each frequency-domain digital sample stream being associated with a subcarrier defining a respective subcarrier channel, and generating a transmitted data stream from the frequency-domain digital sample streams.

Embodiments also relate to a transmission device configured to implement any of the methods previously defined.

According to an embodiment, the device comprises: a modem for generating the composite temporal digital sample stream, a converter for shifting the composite temporal digital sample stream to the intermediate frequency and converting the composite sample stream shifted to the intermediate frequency into analog signals), and an analog stage connected to an antenna for generating the shifted analog signals.

According to an embodiment, the modem is connected to the converter by an optical link.

According to an embodiment, the modem belongs to a group of a plurality of modems connected to a respective input of the converter.

According to an embodiment, the device comprises: a parallel/serial conversion circuit comprising a plurality of inputs connected respectively to the modems, and a serial-to-parallel conversion circuit connected to the parallel-to-serial conversion circuit by a fiber optic link and comprising one output per modem connected to the input of a respective frequency conversion circuit for shifting the composite stream of temporal digital samples supplied by a respective modem, to a respective intermediate frequency.

According to an embodiment, each modem is implemented by a processor controlled by a program or by a programmable circuit.

BRIEF DESCRIPTION OF THE DRAWINGS

Non-limiting examples of the invention will be described hereinafter, in relation to the attached drawings among which.

DETAILED DESCRIPTION

Figures 1, 2, 3, 4:
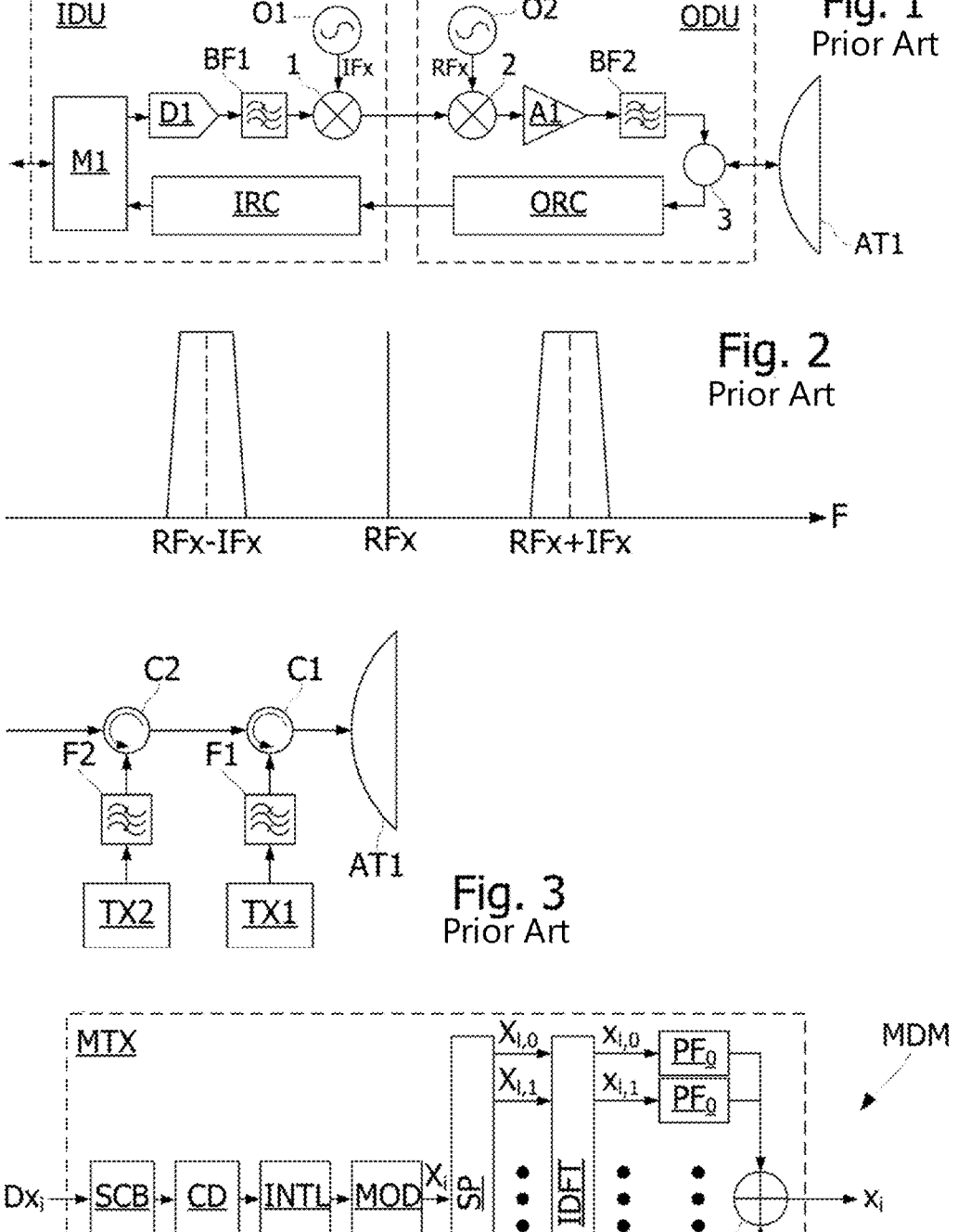
FIG. 1, described above, shows a traditional single-channel transmission system, FIG. 2, described above, shows a frequency spectrum of a signal to be transmitted by the transmission system shown in FIG. 1, FIG. 3, described above, illustrates a device for generating a signal distributed over several transmission channels.
FIG. 4 is a schematic representation of the transmission section of a multichannel digital transmission modem according to an embodiment, FIG. 5 schematically shows an example of the spectrum of the signal produced by the transmission chain, FIG. 6 schematically shows another example of a spectrum of the signal produced by the transmission chain, FIG. 7 schematically shows the receive section of a multichannel digital transmission modem according to an embodiment.

FIG. 4 shows the transmit section MTX of a digital modem MDM in a digital data transmission system. The transmit section MTX may implement OFDM ("Orthogonal Frequency-Division Multiplexing"). In an embodiment, the transmit section MTX is configured for multichannel transmission in an allocated frequency band. The transmit section MTX receives digital data to be conveyed $Dx_i$ from a physical interface, for example Ethernet, which may be connected to an external switch supplying the data to be conveyed. The transmitter section MTX includes scrambling SCB, coding CD, interleaving INTL and modulation MOD modules, a serialization circuit SP, a frequency-to-time-domain transform circuit IDFT, and an adder circuit ADD. The scrambling module SCB is configured to process the received binary data stream so that the bits in the stream have a random, predefined distribution, to avoid long sequences of bits of same value. The coding module CD introduces redundancy or error correction data into the scrambled stream.

The interleaving module INTL receives the output signals from the encoder CD and interleaves them to form data blocks. The modulator MOD receives the data blocks output by the interleaving module INTL and modulates them to produce frequency-domain samples Xi in the form of complex numbers distributed according to a multi-state modulation constellation. The modulation applied may be, for example, QAM (Quadrature Amplitude Modulation), or a PSK (Phase Shift Keying) modulation such as BPSK (Binary PSK) or QPSK (Quadrature PSK). The serialization circuit SP divides the modulated frequency-domain samples Xi from the modulator MOD into vectors X1=(X1,0 . . . , X1,N−1) of size N, where N is greater than 1.

Figure 5:
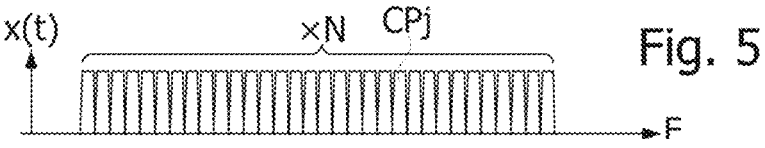

The transformation circuit IDFT performs a transformation from the frequency domain to the time-domain by transforming frequency vectors X1=(X1,0 . . . , X1,N−1) into temporal digital symbols x1=(x1,0 . . . , x1,N−1) made up of N temporal samples x1,0 . . . , x1,N−1. This transformation is achieved by applying an inverse spectral transform of order N to the modulated samples X1,0 . . . , X1,N−1 supplied by the modulator MOD. The inverse spectral transform may be, for example, an inverse fast Fourier transform, or an inverse wavelet transform. The digital signal x(t) including the symbols x1 thus produced has an amplitude spectrum as illustrated in FIG. 5. Each sample x1.j produced corresponds to a modulated subcarrier j, wherein the width of the frequency band allocated to the transmission is divided into N subcarrier channels CPj each corresponding to a subcarrier.

The highest frequency of the allocated frequency band may correspond to the highest frequency of the subcarrier channel located at the highest frequencies, and the lowest frequency of the allocated frequency band may correspond to the lowest frequency of the subcarrier channel located at the lowest frequencies. In this way, the greater the number N of subcarrier channels, the smaller the width of the subcarrier channels, and the higher the operating frequency of the modem MDM, which also depends on the total width of the processed frequency band.

In an embodiment, the subcarrier channels are grouped into transmission channels. In the field of microwave transmission, international regulations impose predefined transmission channel widths. Depending on the country and the transmission frequency (6 GHz or 38 GHz, for example), transmission channel widths are imposed. Typical transmission channel widths are 3.5 MHz, 7 MHz, 14 MHz, 28 MHz, 40 MHz, 56 MHz or 112 MHz. International telecommunication standards (defined by the ITU) impose transmission templates to limit interference generated outside each transmission channel. Narrower transmission channels have tighter constraints regarding the off-channel energy.

It turns out that the value of the last sample x1-1, N−1 of a symbol x1-1 may be very different from that of the first sample x1,0 of the following symbol x1. This discontinuity generates high-frequency components in the spectrum of the time-domain signal resulting from the concatenation of symbols conventionally performed by a serializer or parallel/serial converter, as well as interference between subcarrier channels. To avoid these drawbacks, cyclic prefixes are conventionally inserted between the symbols at the output of the transformation circuit IDFT. Each cyclic prefix is made up of samples calculated by applying windowing between the samples at the ends of each symbol and a cosine-square function, so that the samples at each end of the symbol and its cyclic prefix cancel each other out, thus limiting the level of high-frequency components in the resulting signal and thus the level of energy dissipated outside the corresponding subcarrier channel.

Cyclic prefixes make transmission more robust in the case of multipath transmission, which is essential in the field of mobile transmissions, typically from a relay station to a cell phone. They also reduce the amount of energy transmitted outside each subcarrier channel. This amount of energy can be reduced by increasing the ratio between the duration of each cyclic prefix and the duration of the symbol, or by reducing the spacing between subcarriers. If the allocated frequency bandwidth is fixed, the subcarrier spacing is reduced by increasing the order N of the spectral transform, thus reducing the subcarrier channel width. However, transmitting in very narrow transmission channels (3.5 MHz or 7 MHz), and therefore using a high order N of the spectral transform and an extremely constrained transmission template, considerably increases the complexity of the transmit section MTX of the modem MDM.

Moreover, increasing the duration of cyclic prefixes significantly reduces the spectral efficiency of the transmission system, since an increasing fraction of the transmission time is taken up by the transmission of cyclic prefixes, with the proportion devoted to the transmission of useful data being reduced accordingly.

In an embodiment, the transmit section MTX of the modem MDM does not insert cyclic prefixes between symbols x1, but comprises a set of N digital filters PF0-PFN-1 receiving respectively the N samples x1,0 . . . , x1,N−1 of each symbol x1, the number of subcarrier channels being fixed. The digital filters PF0-PFN-1 have a frequency response configured to significantly attenuate emissions outside the N respective subcarrier channels, and an impulse response limiting discontinuities between the extreme samples x1-1,N−1 and x1,0 of pairs of consecutive symbols x1-1, x1. To this end, the filters PF0-PFN-1 are, for example, polyphase filters, like PHYDYAS, IOTA (Isotropic Orthogonal Transform Algorithm), and MMB (Martin-Mirabassi-Bellange).

So, thanks to cyclic prefix suppression and subcarrier filtering, spectral efficiency remains constant whatever the width of the subcarrier channels. As the number N of subcarriers is fixed, the width of the subcarrier channels depends on the width of the frequency band allocated to transmission. The elimination of cyclic prefixes also enables the same spectral efficiency to be maintained when the width of the subcarrier channels is changed.

In addition, the level of off-channel emissions may be reduced below the levels required by the transmission templates defined for the channels, even when the channels are wider. By eliminating off-channel emissions, the order N of the inverse Fourier transform may be reduced compared to an OFDM transmission solution, reducing the modem implementation complexity.

In an embodiment, null samples are assigned to certain components X1,j of the vectors X1=(X1,0 . . . , X1,N−1) of size N supplied at the input of the transform circuit IDFT, so that no signal is transmitted in certain transmission channels. This offers multichannel transmission that occupies only selected channels within a frequency band covered by the modem MDM.

Figure 6:
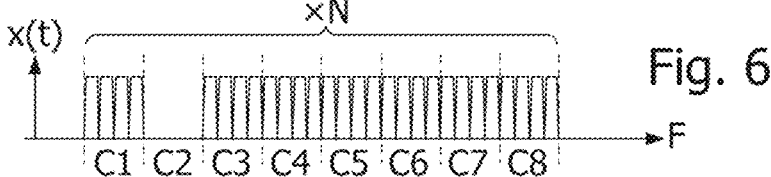

FIG. 6 shows an example of the spectrum of the digital signal x(t) produced at the output of the modem MDM. In the exemplary spectrum of FIG. 6, the N channels or subcarriers are divided into groups C1, C2 . . . C8 of four channels forming transmission channels, with group C2 receiving only null samples so that no transmission occurs in the channels of this group.

In this way, the modem MDM can perform multichannel transmission, wherein the width of the transmission channels is defined by grouping a number of subcarriers per channel and transmitting null samples at the positions of the components of the vector of size N that correspond to channels in which it is not desired to transmit.

Figure 7:
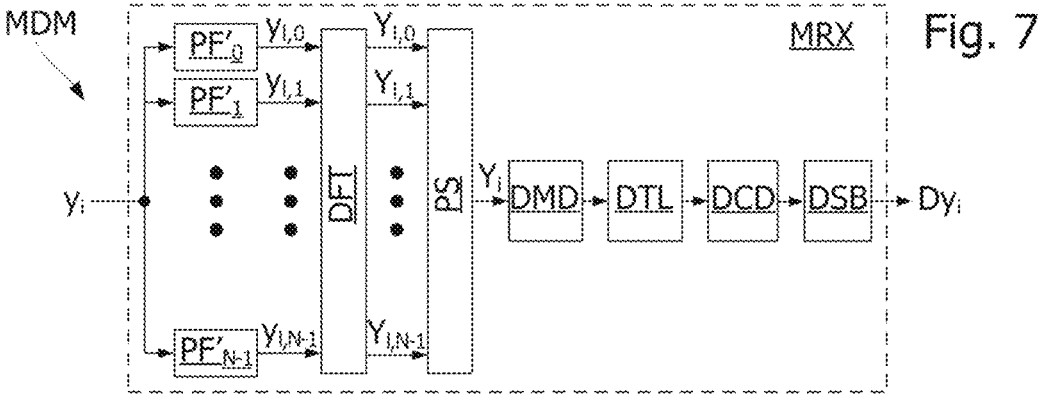

FIG. 7 shows the receive section MRX of the modem MDM, according to an embodiment. The receive section MRX receives baseband digital signals yi. The receive section MRX comprises N filters PF'0-PF'N−1, for example polyphase filters (like those in the transmit section MTX), a transform circuit DFT, a parallel/serial conversion circuit PS, a demodulation circuit DMD, and deinterleaving DTL, decoding DCD, and descrambling DSB modules.

Each of the filters PF'0-PF'N−1 has a template configured to pass signals located in the respective subcarrier channel among the N subcarrier channels, and attenuate signals located outside this channel. The filters PF'0-PF'N−1 are, for example, polyphase filters, like those in the transmit section MTX. Each filter PF'0-PF'N−1 therefore produces a respective component y1,j (j=0 . . . , N−1) of a vector yl of size N, corresponding to a subcarrier. The temporal samples y1,0-y1, N−1 are transformed from the time-domain to the frequency domain by the transform circuit DFT, for example by applying a spectral transform of order N to the frequency-domain samples Y1,0-Y1,N−1. The spectral transform may be, for example, a fast Fourier transform, or a wavelet transform. The frequency-domain samples Y1,0-Y1,N−1 are grouped by the serializer circuit PS into a bitstream Yi, which is successively processed by the demodulator circuit DMD, the deinterleaver module DTL, the decoder module DCD and the descrambler module DSB. The circuits DMD and DTL apply inverse processing to that performed by the circuits INTL and MOD. The decoder DCD decodes the de-interleaved data, correcting transmission errors where necessary and possible, using redundancy data. The descrambler module DSB applies reverse processing to that performed by the scrambler module SCB.

As an example, the number N of subcarriers may be set to 512, and the number of transmission channels in the allocated transmission band may be set to 8, 16 or 32 channels.

As the modem MDM only processes digital signals, it may be implemented entirely by a program-controlled microprocessor, or by a programmable circuit such as an FPGA (Field-Programmable Gate Array).

The scrambling SCB and coding CD modules may require high computing power. If the programmable circuit has insufficient computing power, the modules SCB and CD may be duplicated to process only part of the data to be transmitted, with the other parts of the data to be transmitted being processed in parallel by other duplicated modules SCB and CD.

Figure 8:
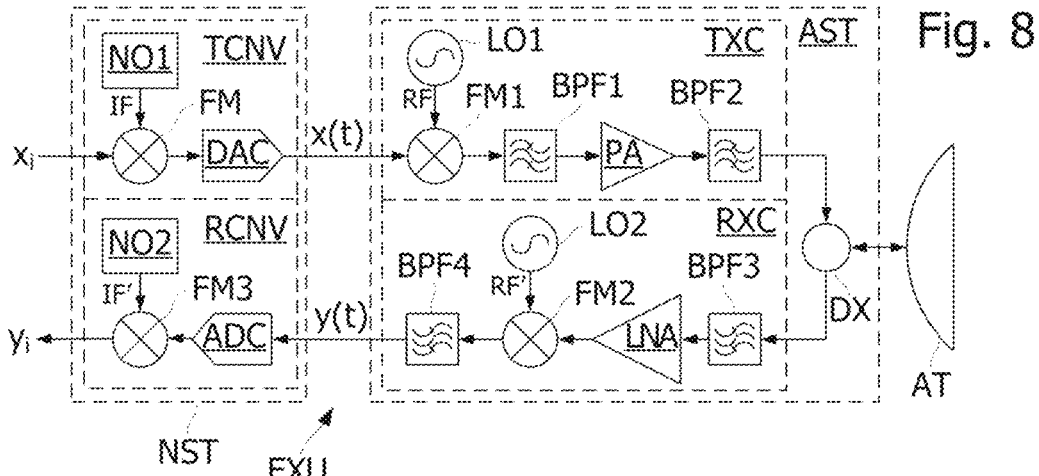
FIG. 8 is a schematic diagram of an outer unit of a multichannel transmission system according to an embodiment, FIG. 9 schematically shows an example of a spectrum of a signal transmitted by the multichannel transmission system, FIG. 10 schematically shows an example of a multichannel transmission system filter profile in relation to transmission channels implemented per transmission chain, FIG. 11 schematically illustrates another example of a digital transmission chain in a multichannel transmission system, FIGS. 12A, 12B, 12C schematically show examples of spectra of internal signals of the multichannel transmitter of FIG. 11, FIG. 13 schematically illustrates a transmitter conversion unit of the multichannel transmission system shown in FIG. 11.

FIG. 8 shows an example of a digital conversion stage NST and an analog stage AST in the transmission system. The digital stage NST comprises a conversion stage TCNV on the transmit side and a conversion stage RCNV on the receive side. The conversion stage TCNV is configured to convert the digital signal xi to be transmitted in baseband at the output of the modem MDM into an analog signal shifted to an intermediate frequency IF. To this end, the conversion stage TCNV comprises a digital oscillator NO1 connected to a digital frequency mixer FM, and a digital-to-analog converter DAC. The mixer FM adds the intermediate frequency IF generated by the oscillator NO1 to the frequency of the samples xi output by the modem MDM, and the converter DAC converts the signal output by the frequency mixer FM into an analog signal which can then be processed by the analog stage AST.

In this manner, the modulated signals in the various transmission channels are merged into a single digital time-domain signal. This digital signal is then shifted from the intermediate frequency IF, still in the digital domain, before being converted into the analog domain at the output of the conversion stage TCNV. As a result, all the signals modulated in the various transmission channels at the output of the modem MDM may be conveyed over a single link to the digital stage NST. This overcomes the constraints imposed by traditional analog transmission systems, which require a modem, a digital-to-analog converter, a coaxial cable conveying the signal at a low intermediate frequency to limit losses, and an outer unit ODU (FIG. 1) for each transmitted channel.

The analog stage AST comprises a transmit chain TXC, a receive chain RXC and a duplexer DX coupling the chains TXC, RXC to an antenna AT. The transmitter TXC receives the analog signal x(t) at the output of the converter DAC of the converter stage TCNV. The transmit chain TXC comprises a local oscillator LO1, a frequency mixer FM1, an amplifier PA, and two bandpass filters BPF1, BPF2. The oscillator LO1 generates a signal at the intermediate frequency RF, provided to the mixer FM1. The analog signal output by the stage TCNV is shifted to the end frequency RF+IF by the mixer FM1, then filtered by the bandpass filter BPF1 before being amplified by the amplifier PA. The amplified signal output by the amplifier PA is filtered by the filter BPF2 before being transmitted to the antenna AT via the duplexer DX. The function of the filter BPF2 is to protect the receive chain RXC from interference caused by the transmit signal, which could overwhelm or desensitize the receive chain RXC.

The receive chain RXC comprises a low-noise amplifier LNA, a frequency mixer FM2, a voltage-controlled local oscillator LO2, and two bandpass filters BPF3, BPF4. The filter BPF3 receives signals from the antenna AT, transmitted by the duplexer DX. The filtered signals output by filter BPF3 are amplified by amplifier LNA, then shifted to an intermediate frequency IF' by mixer FM2, which also receives a frequency RF' from oscillator LO2. The intermediate-frequency shifted signals supplied by the mixer FM2 are filtered by a bandpass filter BPF4 before being transmitted to the conversion stage RCNV. The filter BPF3 may have a template similar to template G2, but passing only the band RXB (centered on the frequency IF'+RF'). The filter BPF4 may have a template G1 rejecting signals with frequencies lower than or equal to the intermediate frequency RF'.

The receive conversion stage RCNV receives the analog signals y(t) shifted to the intermediate frequency, supplied by the filter BPF4. The conversion stage RCNV is configured to convert the analog signal y(t) to baseband and generate digital signals yi that can be processed by the modem MDM. To this end, the conversion stage RCNV comprises an analog/digital converter ADC connected to a digital frequency mixer FM3, which also receives the intermediate frequency IF' from a digitally controlled oscillator NO2. The ADC converts the signal y(t) into digital samples. The frequency mixer FM3 downconverts the samples from intermediate frequency to baseband. The baseband samples yi are transmitted to the receive section MRX of the modem MDM.

Figure 9:
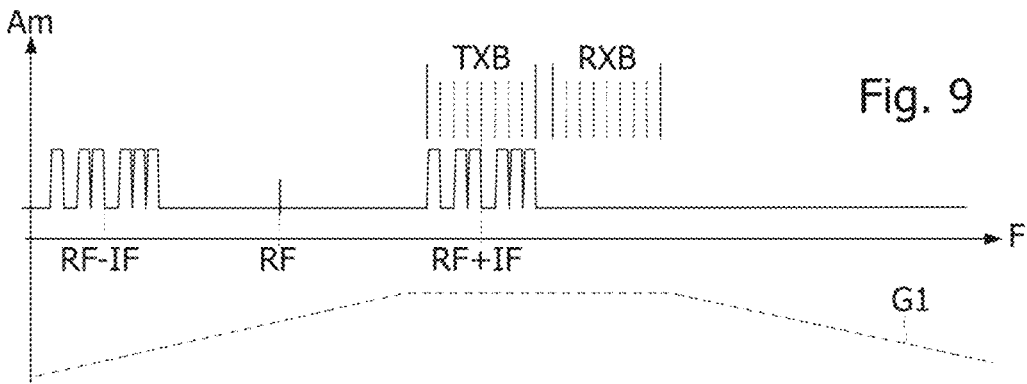

The filter BPF1 provides a single useful image of the output signal of mixer FM1. FIG. 9 shows the spectrum of the output signal of mixer FM1, and the template of filter BPF1. The output signal from the mixer FM1 has three components, namely two components centered respectively on the frequencies RF−IF and RF+IF and modulated by the analog signal from the stage TCNV, and one component at frequency RF. In the example shown in FIG. 9, the filter BPF1 cancels the image of the modulated signal centered on the frequency RF−IF and the component at frequency RF.

In an embodiment, the intermediate frequency IF is set at a value greater than 1 GHz. For example, for a transmission band located around 18 GHz and having a typical width of 1 GHz, the frequency IF is set to at least 2 GHz. It is then possible to use only the filter BPF2, the filter BPF1 then becoming redundant, to reject the entire transmission frequency band.

By setting the intermediate frequency IF at a relatively high value, above 1 GHz, it is possible to implement a relatively low-cost filter (BPF1). Choosing a relatively high intermediate frequency IF reduces the selectivity of the filter BPF1 compared to the filter BPF2 (figure1). For example, the filter BPF1 may have a selectivity of 20 dB at the frequency RF. This means that the filter BPF1 can be produced using a more cost-effective technology than cavity filters, such as a microstrip technology. Moreover, since the rejection requirement is lower, it is possible to place the filter BPF1 before the amplifier PA, whereas in systems of the type shown in FIG. 1, it is necessary to place the filter BF2 after the amplifier A1.

FIG. 9 also shows a frequency band TXB allocated to transmission, subdivided into transmission channels, and centered on the frequency RF+IF, and a frequency band RXB allocated to reception, also subdivided into reception channels, and located outside the frequency band TXB.

For example, the intermediate IF and end RF+IF frequencies are 1.5 GHz and 11 GHz respectively, and the transmission bandwidth TXB is 480 MHz, between 10.76 and 11.24 GHz. The frequency RF is therefore fixed at 9.5 GHz. The filter BPF1 can therefore be configured to reject frequencies below 10 GHz to achieve a rejection ratio of 20 dB at the frequency RF=9.5 GHz.

Since the frequency of the analog output signal from the conversion stage TCNV is relatively high (around the frequency IF), higher than the frequencies of signals that can be transmitted by cables several meters long, it is desirable to limit the length of the link between the output of the conversion stage TCNV and the analog stage AST. The digital converter stage NST may then be placed in a same external unit EXU as the analog stage AST. On the other hand, the signals to be transmitted between the modem MDM and the conversion stage NST are digital, and therefore less sensitive to noise. These digital signals may therefore be transmitted over a relatively longer distance than signals conveyed between the converter stage NST and the analog stage AST. Thus, the link between the modem MDM and the converter stage TCNV can be implemented via coaxial cable or optical fiber.

Figure 10:
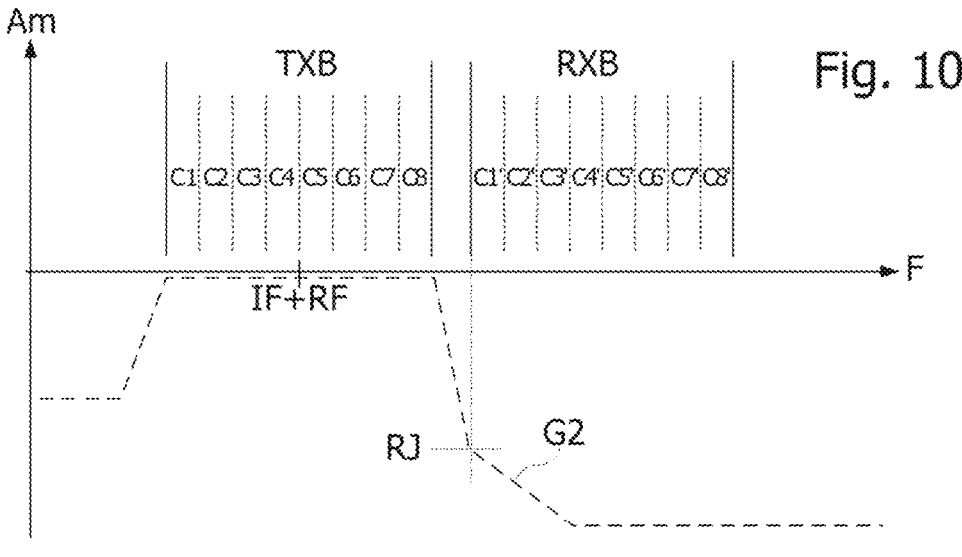

FIG. 10 shows in more detail the transmission channels C1-C8 and C1'-C8' located in the frequency bands TXB and RXB allocated to transmission and reception respectively, and the template G2 of the filter BPF2. The filter BPF2 is configured to present a wide-band template, passing the entire frequency band TXB allocated to transmission, and having sufficient rejection RJ in the frequency band RXB allocated to reception. In particular, the rejection RJ of the filter BPF2 in the band RXB allocated to reception is significantly lower (at least 6 dB) than the amplitude of the minimum signal received by the receive chain RXC minus the signal-to-noise ratio of the chosen modulation. The properties required for the filter BPF2 can be obtained using a cavity filter. However, it should be noted that the selectivity required for the filter BPF2 is much lower than that required for the filters BF1, BF2 (FIG. 3), which must pass a single transmission channel and reject adjacent channels.

Similarly, the intermediate frequency IF' used in the receive chain RXC may also be set at a value above 1 GHz. Here again, the choice of a relatively high intermediate frequency IF' enables the filter BPF4 to be implemented with relatively low selectivity, e.g. 20 dB at the frequency RF'.

The filter BPF4 can therefore be produced using a more cost-effective technology than cavity filters, such as microstrip technology.

The transmission system comprising the modem MDM and the external unit EXU provides multichannel transmission in microwave bands, with software configuration of the individual transmission channels and subcarrier channels. It is therefore possible to dynamically modify the configuration of individual channels and subcarriers, with the hardware architecture of the transmission system depending only on the number of subcarriers (defined by the order of the spectral transforms) and the allocated transmission band (frequency RF), rather than the channel configuration.

In contrast, conventional systems require the use of high-cost cavity filters to combine analog and end-frequency carriers, and these should be manufactured to match the frequency configuration of the various transmission channels.

Thus, the configuration of the stages MDM and EXU in a transmission system may significantly reduce manufacturing costs, and significantly reduce the time required to manufacture and assemble a multichannel system. In fact, the system may be manufactured in advance and warehoused, and the configuration of the carriers, which is carried out solely by software, may be carried out following the installation of the system.

The transmission system formed by the stages MDM and EXU also has the advantage of using the full transmission power of the amplifier stage PA to transmit signals in the various transmission channels. In contrast, much of the power generated in conventional systems is dissipated in cavity filters and circulators. This achieves much greater transmission distances than with conventional systems.

Furthermore, since cavity filters covering a single transmission channel are not required, it becomes possible to use higher frequency bands, in particular the bands at 15 GHz, 18 GHz, 23 GHz and beyond, bearing in mind that it is possible to realize cavity filters with the properties required for filters BPF1 and BPF2 at these frequencies.

Figure 11:
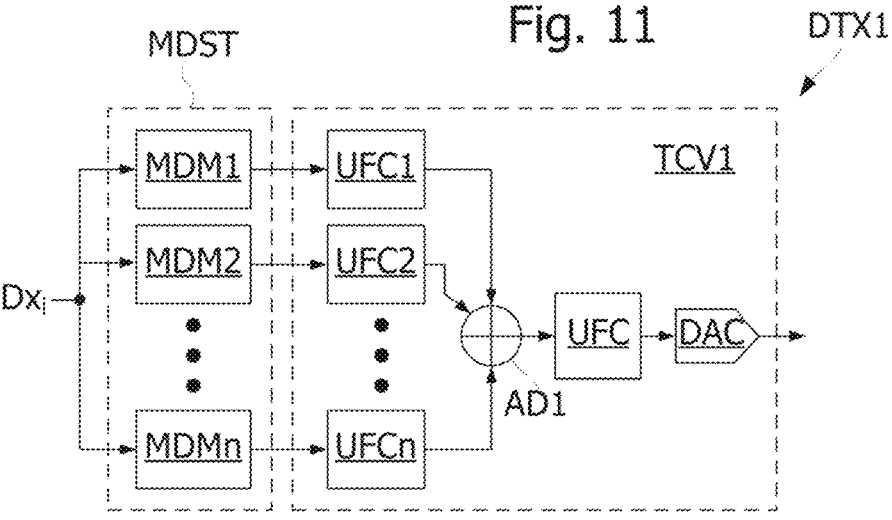

It may be desirable to transmit in several non-contiguous frequency bands. Thus, FIG. 11 shows a transmission chain DTX1 of a multichannel transmission system according to another embodiment. The transmission chain DTX1 comprises a modem stage MDST and a converter stage TCV1 replacing the converter stage TCNV. The modem stage MDST comprises several modems MDM1, MDM2 . . . MDMn, which may be identical to the modem MDM described with reference to FIGS. 4 and 7. The converter stage TCV1 comprises digitally controlled frequency converters UFC, UFC1, UFC2 . . . UFCn and a digital-to-analog converter DAC. Each frequency converter UFC, UFC1-UFCn comprises a digital frequency mixer connected to a digitally controlled oscillator. Each frequency converter UFC1-UFCn is connected to the output of one of the modems MDM1-MDMn.

Each modem MDM1-MDMn in the modem stage MDST receives data Dxi to convey in binary form, and supplies baseband samples in several adjacent channels to a respective converter UFC1-UFCn. Each modem MDM1-MDMn generates samples in a respective set of channels. Each converter UFC1-UFCn raises the frequency of the samples output by the modem MDM1-MDMn to a respective first intermediate frequency centered on the respective frequency band, the frequency bands thus allocated to the modem output samples being spaced apart, so that, after shifting to the frequency RF, the output signals of each of the modems MDM1-MDMn lie within the frequency band allocated to the modem. The frequency bands thus allocated to the modems MDM1-MDMn may be non-contiguous, i.e. separated by unused frequency bands. The output samples from the converters UFC1-UFCn are summed by an adder ADD into a single sample stream, which is processed by the converter UFC to raise the frequency of the output samples from the converters UFC1-UFCn to the intermediate frequency. The converter DAC converts the output signal from the converter UFC into an analog signal which can then be processed by the analog stage AST.

Figures 12A, 12B, 12C, 13:
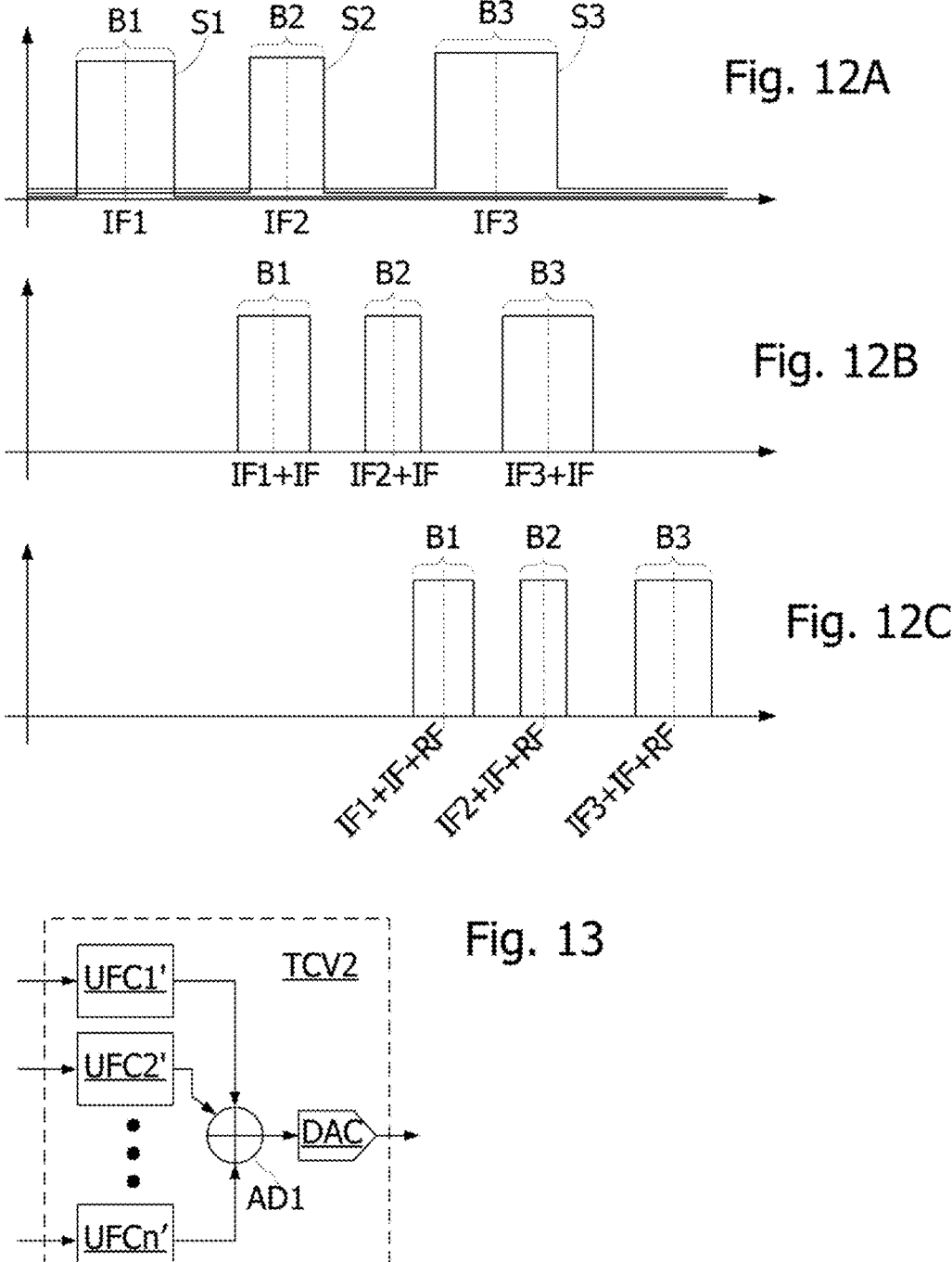

FIGS. 12A, 12B, 12C respectively show examples of spectra of the output signals of the converters UFC1-UFCn, with n=3, of the output signal of the converter UFC, and of the output signal of the converter FM1 of the stage AST, wherein the output signal of the converter UFC is processed by the analog stage AST. The frequency scales (x-axis) used in FIGS. 12A, 12B, 12C are different. In FIG. 12A, the spectra S1, S2, S3 of the signals generated respectively by the converters UFC1, UFC2 and UFC3 are superimposed, and respectively comprise a frequency band B1 centered on the intermediate frequency IF1 used by the converter UFC1, a frequency band B2 centered on the intermediate frequency IF2 used by the converter UFC2, and a frequency band B3 centered on the intermediate frequency IF3 used by the converter UFC3. The frequency bands B1, B2, B3 may be of different widths and subdivided into different numbers of channels.

In FIG. 12B, which represents the output signal of the converter UFC, frequency bands B1, B2, B3 are centered on frequencies IF1+IF, IF2+IF and IF3+IF respectively. In FIG. 12C, which shows the spectrum of the output signal of the frequency converter FM1, frequency bands B1, B2, B3 are centered on frequencies IF1+IF+RF, IF2+IF+RF and IF3+IF+RF respectively.

It can be seen that the converter UFC1 may be omitted, in which case the baseband output signal from the modem MDM1 is supplied directly to the converter UFC. In another embodiment, illustrated by FIG. 13 showing a conversion stage TCV2, the converter UFC is omitted. Thus, the conversion stage TCV2 differs from the conversion stage TCV1 in that it comprises frequency converters UFC1', UFC2', UFCn' connected to the adder ADD, and in that the adder ADD is connected directly to the converter DAC. The converters UFC1'-UFCn' are each connected to a respective modem MDM1-MDMn and each supplies a digital signal directly in the end output frequency band of the converter stage TCV1. In this case, FIG. 12A represents the spectra of the signals before being combined by the adder AD1, the frequency shift step illustrated by FIG. 12B is omitted, and the center frequencies of bands B1, B2, B3 on FIG. 12C are equal to IF1+RF, IF2+RF and IF3+RF respectively.

Figure 14:
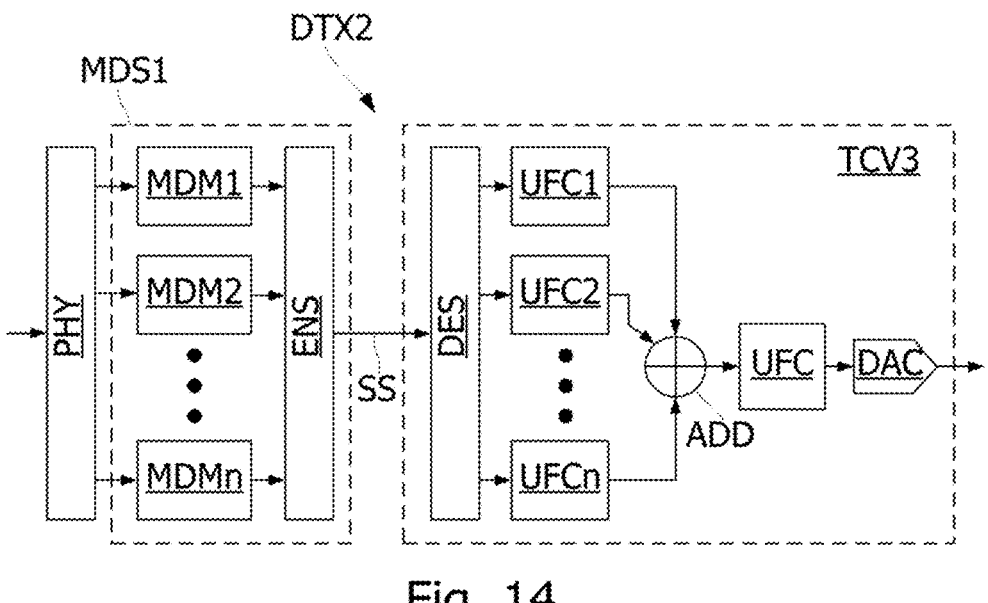
FIG. 14 is a schematic diagram of the transmission chain of a multichannel transmission system in another embodiment.

The frequency of the analog output signal from the conversion stage TCNV, TCV1, TCV2 is relatively high. The converter stage TCNV, TCV1, TCV2 may be placed in an external unit with the analog stage AST, to be positioned as close as possible to the antenna AT. However, if the number of modems in the modulation stage MDST is high, the number of links to the conversion stage is also high. It may therefore be desirable to limit this number of links. Thus, FIG. 14 shows the transmission chain DTX2 of a multichannel transmission system, according to another embodiment. The transmission chain shown in FIG. 14 comprises a modulation stage MDS1 and a conversion stage TCV3. The modulation stage MDS1 differs from the stage MDST in that it comprises a serialization circuit ENS configured to generate a single serial signal SS in which the output signals of the modems MDM1-MDMn are multiplexed. The conversion stage TCV3 differs from the stage TCV1 in that it comprises a deserialization circuit DES connected to the serialization circuit ENS and configured to extract from the serial signal SS the various signals output by the modems MDM1-MDMn and transmit them to the converters UFC1-UFCn, the signal output by a modem MDMi being transmitted to the converter UFCi, where i=1 . . . , n. In this way, the modulation stage MDS1 may be placed in an easily accessible room, and the stage TCV3 may be placed with the analog stage AST as close as possible to the antenna AT, while the stages MDS1 and TCV2 are connected by a simple serial link SS.

In an embodiment, the serial link SS may be established via an optical fiber. Alternatively, the converter stage TCV3 may include no converters UFC1, or only converters UFC1'-UFCn'.

In an embodiment, the converters ENS and DES are implemented with components available from Texas Instruments™ under the reference JES204B, comprising a modem-side transmitter component and a receiver component implementing one or the other of the converters TCV1, TCV2, TCV3.

It will become apparent to those skilled in the art that the present invention is susceptible to various alternatives and applications. In particular, the invention is not limited to the provision of filtering processes per subcarrier channel, on the transmission side, following the inverse spectral transform, and, on the reception side, before the spectral transformation. In fact, it can be provided that the modem inserts cyclic prefixes at transmission and removes these cyclic prefixes at reception.

It is not necessary for the link between the modem MDM or set of modems MDST, MDS1, on the one hand, and the converter TCV1, TCV2, TCV3, on the other hand, to be made via an optical fiber. The use of such a link avoids quality losses in the transmitted signals, particularly when the equipment components are far apart. If the equipment components are installed close together, the loss of signal quality is insignificant.

In the example of FIGS. 8 to 10, the end frequency or center of the transmission band is equal to the sum of the intermediate frequencies IF and RF (or RF' and IF'). The end frequency chosen could also be the frequency RF–IF (or RF'–IF'), depending on the transmission and reception frequency bands in question. In this way, the end frequency may be chosen so that none of the images RF–IF, RF and RF+IF of the frequency shift (FM1) are in the receive band. If the receive band is located at higher frequencies than the transmit band TXB, it is advantageous to choose the frequency RF+IF as the end frequency of the transmit band. If the receive band is located at lower frequencies than the transmit band TXB, it is advantageous to choose the frequency RF–IF as the end frequency of the transmit band. In the latter case, the filters BPF1, BPF2 described above are adapted to reject the frequency RF and a frequency band around the frequency RF+IF. This provision is also applicable to the embodiments of FIGS. 11 to 14 involving intermediate frequencies RF, IF, IF1, IF2, IF3.

The invention claimed is:

1. A multichannel data transmission method comprising the steps of:

generating from a data stream to be transmitted, a plurality of frequency-domain digital sample streams, each digital sample stream modulating a respective subcarrier defining a respective subcarrier channel;

distributing the subcarrier channels over a plurality of consecutive transmission channels having a width of at least 3.5 MHz;

attributing null sample streams to the subcarriers of unused transmission channels;

converting the frequency-domain digital sample streams into temporal digital symbol streams, using an inverse spectral transform (IDFT), without inserting cyclic prefixes between the symbols;

filtering each temporal digital symbol stream by a respective digital filter;

combining the filtered temporal digital symbol streams into a composite temporal digital symbol stream;

frequency shifting the composite temporal digital symbol stream using a digital oscillator to an intermediate frequency above 1 GHz;

converting the shifted composite digital symbol stream into an analog signal;

frequency-shifting the analog signal to a transmission frequency above 2 GHz, using an analog oscillator at a carrier frequency;

filtering the analog signal to attenuate the carrier frequency; and transmitting the shifted analog signal via an antenna.

2. The method according to claim 1, wherein the composite temporal digital symbol stream is transmitted via an optical link before being shifted to the intermediate frequency.

3. The method according to claim 1, comprising the steps of:

generating a plurality of further composite streams of temporal digital symbols in parallel, and shifting each of the further composite streams of temporal digital symbols to a respective intermediate frequency by means of a respective digital oscillator, each of the shifted composite streams of temporal digital symbols being transmitted in analog form in a respective frequency band.

4. The method according to claim 1, wherein the data stream to be transmitted undergoes scrambling so that bits of the stream have a random distribution, coding to introduce redundancy or error correction data into the stream, interleaving to form a stream of data blocks, and modulation to transform the stream of data blocks into a stream of frequency-domain samples in the form of complex numbers.

5. The method according to claim 4, wherein the scrambling and coding are performed by a plurality of scrambling modules and a plurality of coding modules in parallel to increase a transmission rate of the data stream transmitted for interleaving.

6. A transmission device configured to implement the method according to claim 1.

7. A device according to claim 6, comprising:

a modem configured to generate the composite temporal digital symbol stream;

a converter configured to shift the composite temporal digital symbol stream to the intermediate frequency and convert the composite symbol stream shifted to the intermediate frequency into analog signals; and an analog stage connected to an antenna, the analog state configured to generate the shifted analog signals.

8. The device according to claim 7, wherein the modem is connected to the converter by an optical link.

9. The device according to claim 7, wherein the modem belongs to a group of a plurality of modems connected to a respective input of the converter.

10. The device according to claim 9, comprising:

a parallel/serial conversion circuit comprising a plurality of inputs connected respectively to the modems; and a serial-to-parallel conversion circuit connected to the parallel-to-serial conversion circuit by a fiber optic link and comprising one output per modem connected to the input of a respective frequency conversion circuit configured to shift the composite temporal digital symbol stream supplied by a respective modem, to a respective intermediate frequency.

11. The device according to claim 7, wherein each modem is implemented by a processor controlled by a program or by a programmable circuit.

\* \* \* \* \*